Patented June 15, 1937

2,083,908

UNITED STATES PATENT OFFICE 2,083,908

METHOD OF PREPARING 9-AMINO-3,6-DI-METHOXY - 10 - METHYL - ACRIDINIUM CHLORIDES

Sahachiro Hata, Konomu Matsumura, and Kiyoyuki Ishihara, Tokyo, Japan

No Drawing. Application March 16, 1934, Serial No. 715,914. In Japan March 23, 1933

2 Claims. (Cl. 260—36)

The present invention relates to a new method of synthesizing 9-position substitution products of 3,6-dimethoxy-10-methyl-acridinium chloride, which consists in synthesizing 3,6-dimethoxy-9-chlor-10-methyl-acridinium chloride by causing 3,6-dimethoxy-N-methyl-acridone employed as the raw material to react with phosphorus pentachloride, and then causing it to react with ammonia or various kinds of amines to combine carbon at 9-position with various amino radicals. The object thereof is to obtain an excellent sterilizer by utilizing the peculiar nature of the above substances which in spite of their yellow color generally have very weak dyeing power and considerably great sterilizing power.

This invention relates to a synthesizing method which enables carbon in 9-position of 3,6-dimethoxy-10-methyl-acridinium chloride to combine by reaction with any of the alkyl amines, heterocyclic amines and ammonia.

Generally, as to a reaction by which hydrogen combined with nitrogen at 10 position of a combined body of acridone type is substituted by the alkyl radical, there is known Gräbe and Lagodzinski's process (Liebigs Annalen der Chemie, 276, 47, 53 (1893)), which is a process for mixing acridones, caustic alkali and alkyl halide together and causing them to react upon one another under pressure.

According to the present invention, 3,6-dimethoxy-N-methyl-acridone synthesized by any method is employed as the raw material, and by causing it to react with phosphorus pentachloride, 3,6-dimethoxy-9-chlor-10-methyl-acridinium chloride is collected according to the following formula:—

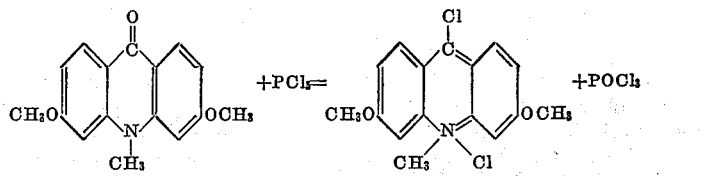

(1)

Then, by causing it to react with various kinds of amines it is acidified with hydrochloric acid and thus the desired object is synthesized as per the following formulas:—

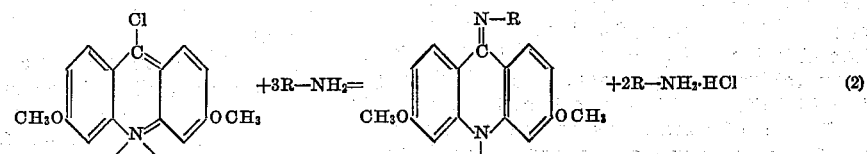

(2)

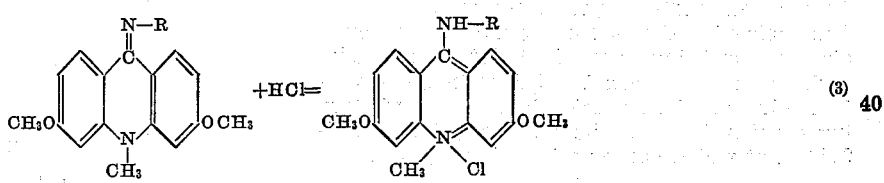

(3)

(Remark: In (2) and (3), "R" denotes H. alkyl radical, or heterocyclic radical.)

The following is an example of carrying out this invention into practice.

(1) The hitherto unknown raw material, 3,6- dimethoxy-N-methyl-acridone is synthesized by the following operation:—

3,6-diamino-acridone    3,6-dioxy-acridone    3,6-dimethoxy-acridone

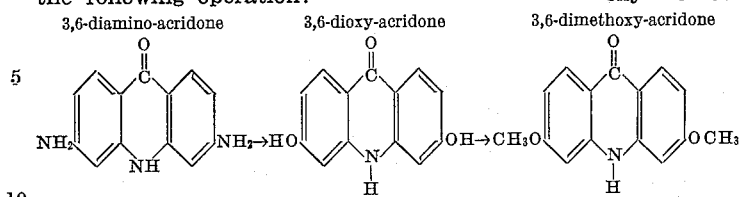

See about this method: Journal of the American Chemical Society, vol. 51 (1929), pages 816–820.

By causing 3,6-dimethoxy-acridone thus obtained to react under pressure with excesses of potassium hydroxide and methyl iodide (by the before-mentioned Gräbe and Lagodzinski's process)

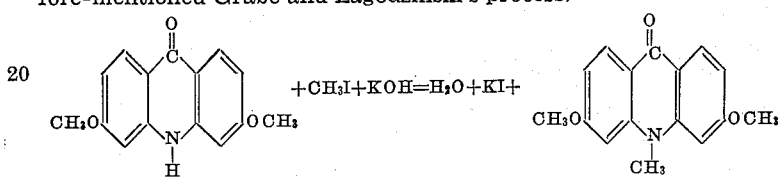

3,6-dimethoxy-N-methyl-acridone is collected according to the Formula (4). When this substance is recrystallized from a benzene solution, the crystal has benzene of crystallization, which however volatilizes easily and 3,6-dimethoxy-N-methyl-acridone having the following constitution and the melting point of 177–178° C. may be obtained (the yield being about 40% of the theoretical quantity).

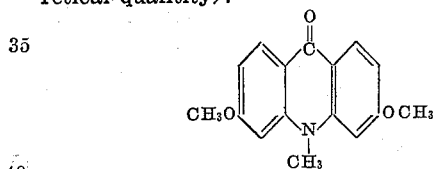

(2) Put 100 grams of 3,6-dimethoxy-N-methyl-acridone in a suitable vessel provided with a moisture-proof reflux condenser, and after adding thereto 750 grams of phosphorus oxychloride, mix them intimately by stirring. Add 100 grams of phosphorus pentachloride and boil the mixture, stirring it in an oil bath at 120–130° C. for about two hours, after which it is distilled to recover the greater portion of phosphorus oxychloride. Cool the remaining liquor with ice and stir and filter it with the addition of 700 grams of benzol. Next, wash it with benzol and dry it under reduced pressure, and then about 150 grams of crude, 3,6-dimethoxy-9-chlor-10-methyl-acridinium chloride will be obtained. Use it as it is or recrystallize it from an aqueous solution in which it is first dissolved in the ratio of 1 vol. of crystals to 70 vol. of water, having the temperature of 70° C., as the raw material for the next stage of the operation. If recrystallized from water, it forms a red needle-shaped crystal which contains four molecules of water of crystallization immediately after being crystallized, but the one dried under reduced pressure is 3,6-dimethoxy-9-chlor-10-methyl-acridinium chloride having the following constitution and the melting point of 234–236° C. at which decomposition takes place.

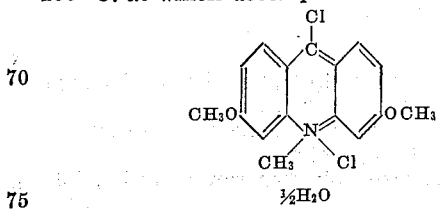

(3) Dissolve 1 molecular weight of 3,6-dimethoxy-9-chlor-10-methyl-acridinium chloride in seventy parts of water by heating at about 60°–70° C. and add thereto 3 molecular weights (or a little more) of the desired amine diluted with a small quantity of water. (In the event that a heterocyclic amine of difficult solubility in water

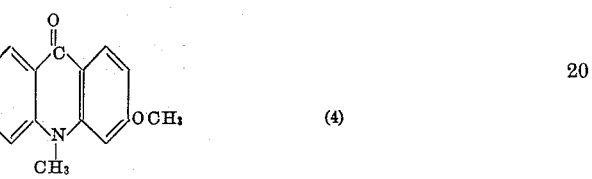

is employed, the amine is used without solution or dissolved in a suitable quantity of alcohol or methyl alcohol.) The mixture is stirred and the solution will react instantly and usually will turn from a reddish brown to a yellow color and the basic compound produced by the reaction will have a milky or crystalline form. 5 to 7 molecular weights of 30% hydrochloric acid is added whereupon aromatic amino derivative of difficult solubility will crystallize out in needle shaped crystals while highly soluble alkyl amino derivative will partially crystallize out in needle shaped crystals. The readily soluble alkyl amino derivative is concentrated by evaporation and is dried after being washed with water, more than 90% of the theoretical quantity being thus normally obtained. The substance thus obtained is redissolved in a solvent such as water, 3% hydrochloric acid or dilute acetic acid by the application of heat and is then recrystallized.

(4) The desired object may be obtained easily by extracting with chloroform the basic compound produced by causing water solution of 3,6-dimethoxy-9-chlor-10-methyl-acridinium chloride to react with amines, further extracting it with dilute hydrochloric acid and then concentrating and purifying the crystal collected.

By the present method the inventors have created various kinds of 9-amido derivatives, and after ascertaining their constitutions by analysis have measured their physical constant numbers, a part of which are listed hereafter:—

Remark: In the table, A— represents

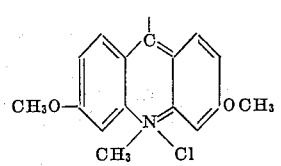

The melting points generally agree with the decomposing points. As to the water of crystallization, the molecule number is the one corresponding to its stage of equilibrium in a vacuum dryer, and the melting point is the value of the measurement in that condition. The Celsius scale is used.

| Name | Constitution | Melting point (decomposition) |
|---|---|---|
| 3,6-dimethoxy-9-amido-10-methyl-acridinium chloride | A—NH$_2$ | 324–325 |
| 3,6-dimethoxy-9-methyl-amido-10-methyl-acridinium chloride | A—NH—CH$_3$·⅔H$_2$O | 271–272 |
| 3,6-dimethoxy-9-ethylamido-10-methyl-acridinium chloride | A—NH—C$_2$H$_5$ | 246–247 |
| 3,6-dimethoxy-9-propylamido-10-methyl-acridinium chloride | A—NH—CH$_2$—CH$_3$·H$_2$O | 231–232 |
| 9,9′-ethylenediamido-bis (3,6-dimethoxy-10-methyl acridinium chloride) | A—NH—CH$_2$—CH$_2$—NH—A·5H$_2$O | 321–322 |
| 9-piperazido-3,6-dimethoxy-10-methyl-acridinium chloride (hydro-chloric acid salt) | A—N(CH$_2$—CH$_2$)$_2$NH·HCl·3H$_2$O | 232–233 |
| 9,9′-piperazido-bis (3,6-dimethoxy-10-methyl-acridinium chloride) | A—N(CH$_2$—CH$_2$)$_2$N—A·3⅓H$_2$O | 275–276 |
| 3,6-dimethoxy-9-p-phenetidino-10-methyl-acridinium chloride | A—NH—C$_6$H$_4$—OC$_2$H$_5$·2H$_2$O | 238–239 |
| 3,6-dimethoxy-9-p-toluidino-10-methyl-acridinium chloride | A—NH—C$_6$H$_4$—CH$_3$·2⅔H$_2$O | 225–226 |
| 3,6-dimethoxy-9-m-toluidino-10-methyl-acridinium chloride | A—NH—C$_6$H$_4$(CH$_3$)·2H$_2$O | 246–247 |
| 3,6-dimethoxy-9-o-toluidino-10-methyl-acridinium chloride | A—NH—C$_6$H$_4$(CH$_3$) | 256–257 |

The physiological actions of the above-mentioned different derivatives were tested, and the following is the physiological action of 3,6-dimethoxy-9-methylamido-10-methyl-acridinium chloride which is considered to be most suitable for practical purpose.

*Poisonous property.*—A dilute solution of this substance was injected slowly underneath the skin of a mouse and a marmot used for experimental purposes and their health was examined for a certain space of time. The following is the maximum quantity of the injection of this substance to be endured by each animal, shown in gram per 1 kilogram of the animals' weight.

|  | Grams |
|---|---|
| Mouse | 0.071 |
| Marmot | 0.05 |

*Experiment on disinfection*

In an experiment on disinfection in a test tube, it showed strong disinfecting power against *Streptococcus haemolyticus* and *Bacillus diphtheriae*, *Bacillus tetani* and *Bacillus hystriticus* and did not have such power weakened by the presence of albuminous matters. The following is its disinfecting power against each bacillus in the effective minimum concentration:—

|  | Times diluted |
|---|---|
| *Streptococcus haemolyticus* | 800,000 |
| *Bacillus diphtheriae* | 200,000 |
| *Bacillus tetani* | 200,000 |
| *Bacillus hystriticus* | 330,000 |

Its disinfecting power (healing power or the power for preventing the attack of a disease) against each of the above-mentioned bacilli in the bodies of the animals is shown below in the minimum effective quantity per 1 kilogram of their weight:—

|  | Grams |
|---|---|
| Mouse infected with *Streptococcus haemolyticus* | 0.0025–0.00166 |
| Marmot infected with *Bacillus diphtheriae* | 0.0011 |
| Mouse infected with *Baccillus tetani* | 0.025 |
| Mouse infected with *Bacillus hystriticus* | 0.0025 |

Upon comparing the above physiological action with that of the known acridin derivative, for example, 3,6-diamino-10-methyl-acridinium chloride, it is far weaker in poisoning power and a little stronger in disinfecting power, so it need not be said that the product of this invention is superior to the known one in the healing power. Even if compared with 3,6-dimethoxy-9-amido-10-methyl-acridinium chloride mentioned before, it has its poisoning power reduced to about two thirds, and possesses substantially the equal effect, although somewhat reduced according to bacteria.

Moreover, this product has no disagreeable yellow dyeing property and is easy to dissolve in water, so that even if dissolved in 300 times as much water by weight, it will not be crystallized at the room temperature. Further, having only a weak tendency of being precipitated by sodium chloride, it is preeminently adapted to be diluted with physiological salt water.

We claim:

1. Method of preparing 9-position substitution derivative compounds of 3,6-dimethoxy-10-methyl-acridinium chloride, which consist in synthesizing 3,6-dimethoxy-9-chlor-10-methyl-acridinium chloride by causing 3,6-dimethoxy-N-methyl-acridone employed as the raw material to react with phosphorus pentachloride, and then causing it to react with 3 molecular weights of alkyl amine to combine the carbon atom at 9- position with the alkyl amino radical and acidifying it with hydrochloric acid.

2. Method of preparing 3,6-dimethoxy-10-methyl-acridinium chloride, having the R—NH radical in 9-position carbon, which consists in causing 3,6-dimethoxy-9-chlor-10-methyl-acridinium chloride obtained by the reaction of 3,6-dimethoxy N-methyl acridone with phosphorus pentachloride, to react with 3 molecular weights of a compound of formula $RNH_2$ wherein R is selected from the group consisting of hydrogen and alkyl and then acidifying the product thus obtained with hydrochloric acid.

SAHACHIRO HATA.
KONOMU MATSUMURA.
KIYOYUKI ISHIHARA.